(12) United States Patent
Cvek

(10) Patent No.: US 6,896,230 B2
(45) Date of Patent: May 24, 2005

(54) EQUIPOISE ARM ASSEMBLY

(76) Inventor: Sava Cvek, 40 Woodland Rd., Jamaica Plain, MA (US) 02130

( * ) Notice: Subject to any disclaimer, the term of this patent is extended or adjusted under 35 U.S.C. 154(b) by 82 days.

(21) Appl. No.: 10/334,094

(22) Filed: Dec. 30, 2002

(65) Prior Publication Data

US 2004/0124328 A1 Jul. 1, 2004

(51) Int. Cl.⁷ .................................................. E04G 3/00
(52) U.S. Cl. ................................................. 248/276.1
(58) Field of Search ........................... 248/276.1, 278.1, 248/279.1, 280.11, 281.11, 282.1, 284.1, 920

(56) References Cited

U.S. PATENT DOCUMENTS

| | | |
|---|---|---|
| 2,076,446 A | 4/1937 | Carwardine |
| 2,787,434 A | 4/1957 | Jacobsen |
| 3,041,060 A | 6/1962 | Jacobsen |
| 3,219,303 A | 11/1965 | Stryker |
| 3,226,073 A | 12/1965 | Jacobsen et al. |
| 3,311,340 A | 3/1967 | Riis |
| 3,543,019 A | 11/1970 | Jacobsen |
| 3,774,873 A | 11/1973 | Krogsrud |
| 4,080,530 A | 3/1978 | Krogsrud |
| 4,160,536 A | 7/1979 | Krogsrud |
| 4,447,031 A * | 5/1984 | Souder et al. ......... 248/281.11 |
| 4,744,019 A | 5/1988 | Krogsrud |
| 4,796,162 A | 1/1989 | Krogsrud |
| 4,846,434 A | 7/1989 | Krogsrud |
| 4,953,822 A * | 9/1990 | Sharber et al. ........ 248/281.11 |
| 5,097,400 A | 3/1992 | Cvek |
| 6,378,829 B1 * | 4/2002 | Strater et al. ............ 248/276.1 |
| 2003/0075658 A1 * | 4/2003 | Beissel et al. ........... 248/284.1 |

* cited by examiner

Primary Examiner—Ramon O. Ramirez
(74) Attorney, Agent, or Firm—O'Connell Law Firm

(57) ABSTRACT

An equipoise arm assembly for supporting an article in equipoise with a support arm, a proximal arm joint, a distal arm joint for supporting an article either directly or through a second support arm, a spring arrangement including a spring member with a distal end coupled to a body portion of the support arm and a proximal end pivotally retained to pivot about an effective pivot axis to create a spring force moment arm of a given length whereby the spring arrangement will tend to provide a resistive torque in support to the support arm, and an arrangement for altering the effective pivot axis of the spring arrangement to change the length of the spring force moment arm.

40 Claims, 10 Drawing Sheets

EQUIPOISE ARM ASSEMBLY

FIELD OF THE INVENTION

The present invention relates generally to support structures. Stated more particularly, this patent discloses and protects an arm assembly for supporting an article in a state of equilibrium and demonstrating obedient movement in the support of that article.

BACKGROUND OF THE INVENTION

There are, of course, numerous applications where movable arms are employed for supporting one or more articles. By way of example, a multitude of structures has been disclosed for use in home, office, medical, and other applications wherein a lamp is supported by one or more articulated arms. Other articulated arm arrangements have been disclosed for supporting magnifying arrangements of various sizes, weights, and configurations. Still other arm arrangements have been particularly designed for providing adjustable support to computer monitors and similar articles.

In these and further articulated arm structures, a most fundamental goal is to support the retained article in a state of perfect equilibrium over a broad range of adjustment of the angular disposition of the arm or arms. What may be considered the ultimate goal is to enable the angle at which the arm or arms are disposed to be adjusted by the application of a minimal motive force even where the retained article is of a relatively significant weight. With this, designers of the prior art have sought for many years to develop an arm arrangement that can retain an article in an equipoise relationship over an infinitely variable range of angles that can be moved from equipoise position to equipoise position with the application of the slightest motive force.

For a plurality of reasons, however, the creation of such an ideally performing mechanical arm arrangement has proven elusive. One fundamental challenge that has confronted inventors of the prior art derives from the fact that, as the angle of a support arm changes relative to vertical, the resistive force required to retain it in an equipoise condition will necessarily vary as well. Accommodating that changing moment arm is rendered particularly difficult in a mechanical arm arrangement since it varies over a nonlinear sine curve as the angular disposition of the support arm is progressively increased or decreased.

Numerous prior art devices have sought to provide the required counterbalancing force by means of one or more resiliently compressible or extendible members, such as coil springs or elastic members, appropriately interposed in a parallelogram arm arrangement. The use of such spring arrangements can be effective to an extent since the springs can be arranged to demonstrate resistance that increases or decreases in general correspondence to the force required to support the retained article. However, over its elastic range, the force required to stretch or compress a spring varies linearly pursuant to the spring constant. As a result, the linear resistance imparted by an unobstructed spring of a given length fails to correspond to the nonlinear downward force of the retained article as the support arm is moved through a given angular range. Consequently, even when a spring arrangement has been specifically designed to support a given weight, the spring or springs will tend to provide excessive resistance over one or more portions of the arm's range of motion while providing too little resistance over one or more other portions of the arm's range of motion. With this, although highly desirable, crafting an arm arrangement capable of supporting an article in a state of equipoise over a broad range of arm angles has been notably difficult.

A plurality of additional issues and considerations further complicate the design and manufacture of equipoise support arms. One significant consideration derives from the fact that equipoise arms must support articles of differing weights. In certain designs, a given arm skeleton will be employed for supporting differently weighted articles by substituting springs with spring constants calibrated to suit the particular weight to be supported. However, it will be appreciated that such a practice leads to a plurality of complications. For example, the manufacturer must keep a stock of all possible springs, and confusion between marginally different springs must somehow be avoided. A further design issue derives from the fact that electrical power often must be provided to the supported article such that wiring must normally traverse the support arm or arms thereby harming the aesthetics of the arm construction and possibly interfering with the function of the arm or arms. Even further, in many prior art arrangements, each arm is founded on a parallelogram formed by multiple exposed bars that can pinch and otherwise pose a potential danger to the user.

In light of the foregoing, it becomes clear that there is a cognizable need in the art for a truly obedient arm assembly that can be moved with the application of the slightest motive force while accommodating the nonlinear change in moment arm presented by the arm or arms over a broad range of angles. It will be additionally appreciated that there are further distinct needs for an obedient arm assembly that is capable of accommodating articles of differing weights, that can shield wiring from view and damage, and that can avoid presenting any danger to the operator. It will be clearer still that an obedient arm assembly providing a solution to each of the needs and problems described above while providing a plurality of advantages thereover would represent a marked advance in the art.

SUMMARY OF THE INVENTION

Advantageously, the present invention is founded on the most broadly stated object of providing an equipoise arm assembly that meets each of the needs left by the prior art while providing a number of heretofore unrealized advantages thereover.

A more particular object of certain embodiments of the invention is to provide an equipoise arm assembly that enables an article to be supported in equipoise over a broad range of support angles.

A related object of particular embodiments of the invention is to provide a mechanical equipoise arm assembly that can provide resistive support corresponding to nonlinear changes in the moment arm presented by an arm or arms.

Yet another object of certain embodiments of the invention is to provide an equipoise arm assembly that can be moved between equipoise positions with the application of a very slight force.

Still another object of embodiments of the invention is to provide an equipoise arm assembly that can adapt to provide support to articles of differing weights.

An even further object of the invention is to provide an equipoise arm assembly that can retain electrical wiring generally shielded from external view and from damage.

Even further still, an object of certain embodiments of the invention is to provide an equipoise arm assembly that is not likely to pinch or crush an operator's body parts or other surrounding elements.

These and further objects and advantages of the invention will become obvious not only to one who reviews the present specification and drawings but also to one who has an opportunity to make use of an embodiment of the present invention for an equipoise arm assembly. However, it will be appreciated that, although the accomplishment of each of the foregoing objects in a single embodiment of the invention may be possible and indeed preferred, not all embodiments will seek or need to accomplish each and every potential object and advantage. Nonetheless, all such embodiments should be considered within the scope of the present invention.

In carrying forth these and further objects, a most basic embodiment of the equipoise arm assembly is founded on a support arm with a body portion having a proximal end and a distal end. A proximal arm joint is pivotally coupled to the proximal end of the support arm at a proximal pivot axis, and a means, such as a second support arm or an attachment mechanism, is provided for supporting an article relative to the distal end of the support arm. In certain embodiments, a spring arrangement, which includes a spring member, can have a distal end coupled to the body portion of the support arm and a proximal end pivotally coupled to the proximal arm joint to pivot about an effective pivot axis that is spaced a given distance from the proximal pivot axis. As a result, the spring arrangement creates a spring force moment arm of a given length such that it will tend to provide a resistive torque in support of the support arm against rotation in a given direction. A means is provided for altering the effective pivot axis of the spring arrangement to change the length of the spring force moment arm such that the spring arrangement will provide a different resistive torque in support of the support arm over a given portion of a range of pivoting of the support arm.

The means for altering the effective pivot axis of the spring arrangement can take the form of a stop surface disposed adjacent to a portion of the spring arrangement in combination with an open area adjacent to the stop surface. Under such an arrangement, the support arm can be pivoted through a given range of pivoting with the portion of the spring arrangement pivoting through at least part of the open area until the portion of the spring arrangement makes contact with the stop surface. At that point, further pivoting of at least part of the portion of the spring arrangement will be prevented such that the effective pivot axis of the spring arrangement will be altered. The spring arrangement can include a pivot link coupled to the proximal arm joint, and the stop surface and the open area can be disposed adjacent to the pivot link. With that, the pivot link can be pivoted through a given range of pivoting until at least a portion of the pivot link makes contact with at least a portion of the stop surface whereupon at least a portion of the pivot link will be prevented from further pivoting and the effective pivot axis of the spring arrangement will be altered.

The pivot link can in certain embodiments comprise a flexible member, and the stop surface can be variably sloped such that the pivot link will progressively make increasing contact with the stop surface as the support arm is pivoted. With that, a moving effective pivot axis will be provided for the spring arrangement. Alternatively or additionally, the spring arrangement can include multiple pivot links, which can be rigid. A variably sloped stop surface can be provided such that the pivot links will make sequential contact with the stop surface as the support arm is pivoted thereby creating a moving effective pivot axis. In such an embodiment, the stop surface can have a plurality of variably sloped subsections for contacting a plurality of the pivot links. Under certain embodiments, the open area can take the form of a pivot alcove in the proximal arm joint.

In any case, a parallelogram pivoting arrangement can be established between the support arm and the proximal and distal arm joints such that the distal arm joint will demonstrate parallel movement relative to the proximal arm joint. That parallelogram pivoting arrangement can be provided by first and second control arms each with a proximal end pivotally coupled to the proximal arm joint and a distal end pivotally coupled to the distal arm joint. Where at least a first control arm forms part of the parallelogram pivoting arrangement, the distal end of the spring arrangement can be coupled to the first control arm. The spring arrangement in certain cases can include a plurality of spaced coupling points for the spring member such that it can have any one of a variety of initial spring extensions. Under such a construction, the spring arrangement can be readily adapted to provide support to articles of differing weights.

The spring arrangement could possibly include a slidable coupler coupled to the proximal arm joint, and the plurality of spaced coupling points could be disposed on the slidable coupler. Where a slidable coupler is included, a means can be provided for slidably coupling the slidable coupler to the first control arm. Also, an arm casing with an open inner volume for housing at least a portion of the spring arrangement and at least a portion of the first control arm can be included, and, where there are multiple coupling points for the spring member, the arm casing can have a window therein for allowing access thereto.

In certain cases, the means for altering the effective pivot axis of the spring arrangement can cause the spring arrangement to demonstrate a non-linear resistive torque pattern that corresponds more than a linear resistive torque pattern would to the non-linear torque pattern imparted on the proximal arm joint by the weights of the support arm and the article over a range of pivoting of the support arm. By way of example, the non-linear resistive torque pattern exhibited by the spring arrangement could be modified to correspond generally to a pattern established by the following formula:

$$T_s = (W_s + 1.5 W_a) \cdot L \cdot \sin \alpha$$

where $T_s$ is the torque imparted by the spring arrangement, $W_s$ is the cumulative weight of the article and any other elements supported by the support arm, $W_a$ is the weight of the support arm, L is the length of the support arm, and a is the angle between the support arm and vertical.

In certain embodiments, a support arm, which can be employed alone or in combination with another arm, can comprise a control arm that pivots about the proximal pivot axis and a disparate member that pivots relative to the proximal arm joint with the control arm. The means for altering the distance between the effective pivot axis of the spring arrangement and the proximal pivot axis of the support arm during a pivoting of the support arm can comprise a coupling of the proximal end of the spring arrangement to the disparate member. Under such a construction, the means for altering the distance between the effective pivot axis and the proximal pivot axis can operate to decrease the distance between the effective pivot axis and the proximal pivot axis during a pivoting of the support arm to decrease the length of the spring force moment arm. The disparate member can take the form of an arm housing that at least partially encases the control arm, and the proximal end of the spring arrangement can be pivotally coupled to the arm housing.

One will appreciate that the foregoing discussion broadly outlines the more important features of the invention to enable a better understanding of the detailed description that follows and to instill a better appreciation of the inventor's contribution to the art. Before an embodiment of the invention is explained in detail, it must be made clear that the following details of construction, descriptions of geometry, and illustrations of inventive concepts are mere examples of the many possible manifestations of the invention.

DETAILED DESCRIPTION OF PREFERRED EMBODIMENTS

As with many inventions, the present invention for an equipoise arm assembly can assume a wide variety of embodiments. However, to assist those reviewing the present disclosure in understanding and, in appropriate circumstances, practicing the present invention, certain exemplary embodiments of the equipoise arm assembly are described below and shown in the accompanying drawing figures.

Figure 1:
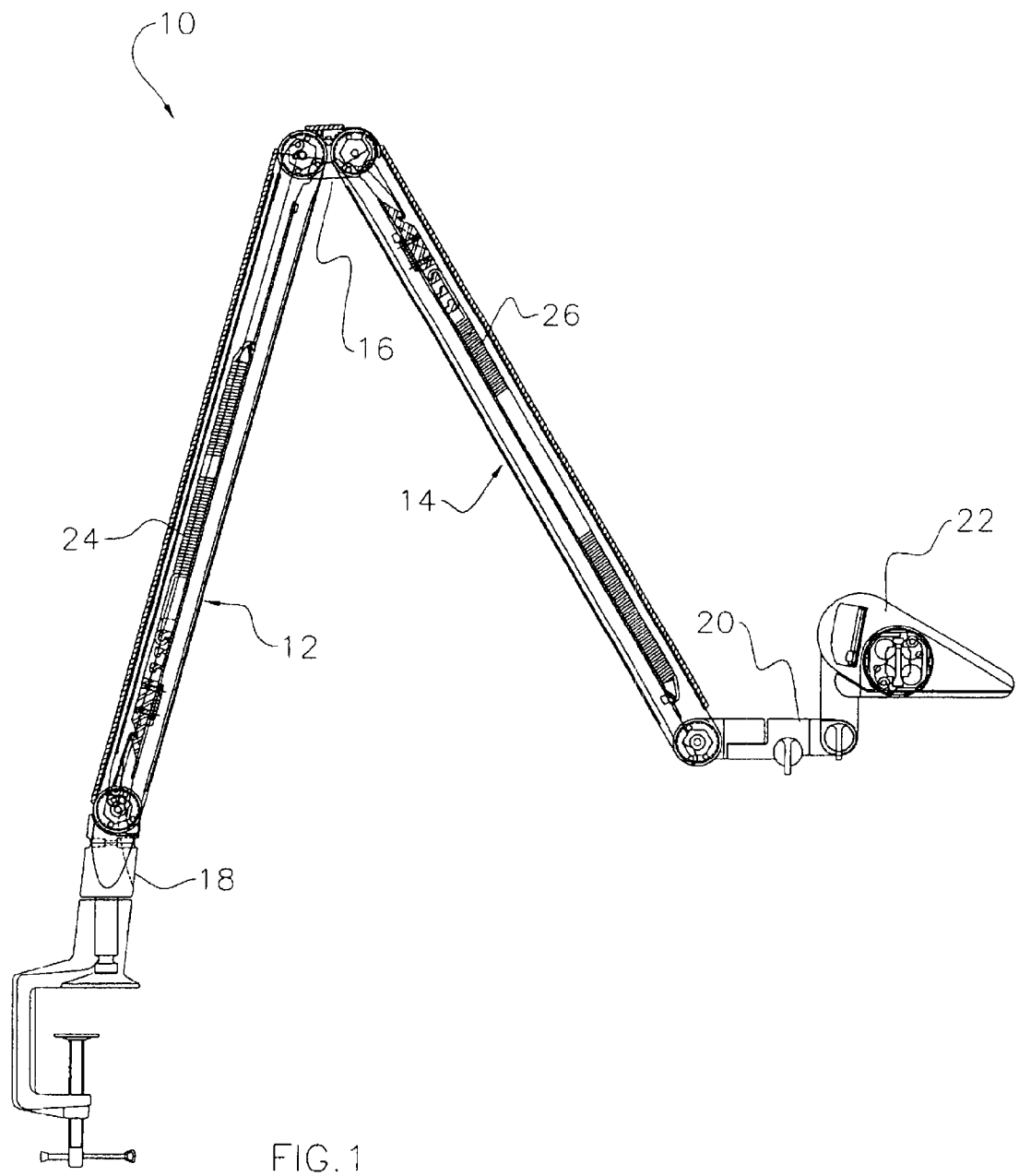
FIG. 1 is a schematic view in side elevation of an exemplary equipoise arm assembly.

Looking more particularly to the drawings, an exemplary equipoise arm assembly is indicated generally at 10 in FIG. 1. There, the exemplary equipoise arm assembly 10 is founded on a first, lower support arm 12 that is joined to a second, upper support arm 14 by a middle joint 16. More particularly, the lower support arm 12 has a proximal end retained by a lower arm joint 18 that supports the equipoise arm assembly 10 relative to a support structure (not shown) and a distal end coupled to the middle joint 16. The upper support arm 14 has a proximal end coupled to the middle joint 16 and a distal end coupled to an upper arm joint 20. As will be described more fully herein, a lower arm spring 24 provides resistive support to the lower support arm 12 and an upper arm spring 26 provides resistive support to the upper support arm 14. Although the lower and upper arm springs 24 and 26 are depicted generally in these exemplary embodiments as coil springs, it should be appreciated that the term spring should be construed to include any elastic body or device that generally recovers its original shape or length when released after being distorted. Finally, the upper arm joint 20 retains what can for convenience be termed a supported article 22. In practice, the supported article 22 can comprise any element that might desirably be supported by the equipoise arm assembly 10 including, by way of example, a light, a magnifying lens, or a computer or television monitor.

Figure 2:
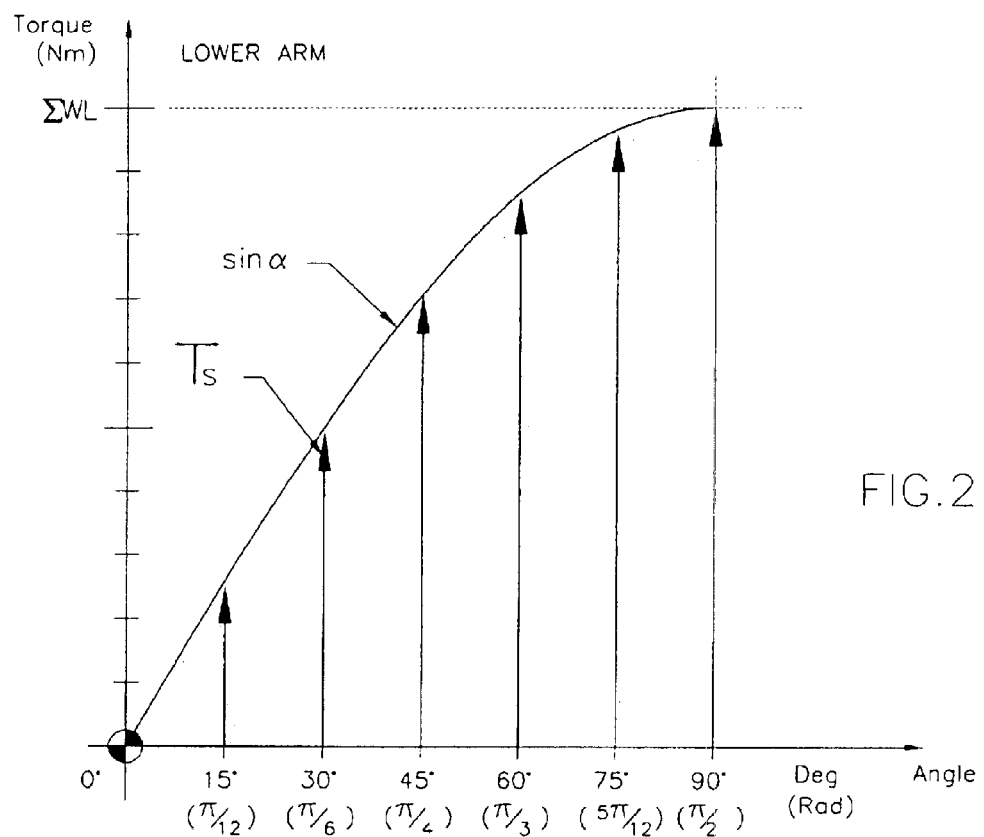
FIG. 2 is a graph of the torque imparted by the weights of the arm or arms and the supported article on the lower arm joint as a function of the angular disposition of the lower arm.

Under such an arrangement, as the angles at which the support arms 12 and 14 are disposed are varied relative to vertical, the torque experienced at the proximal end of each of the lower and upper support arms 12 and 14 will follow a sine curve. More particularly, as FIG. 2 shows, the torque imparted on the lower arm joint 18 by the combined weight of the lower and upper support arms 12 and 14 in combination with the weight of the supported article 22 will follow a rising sine curve as the angle of disposition of the lower support arm 12 is varied between 0 and 90 degrees relative to vertical. As shown in Formula 1 below, the torque (T) imparted by the lower and upper support arms 12 and 14 can be calculated as being equal to the sum of the weights of the arms 12 and 14 and the supported article 22 multiplied by the moment arm ($\Sigma WL$) multiplied by the sine of the angle ($\alpha$) between the lower support arm 12 and vertical.

$$T = (\Sigma WL)\sin \alpha \tag{1}$$

Figure 3:
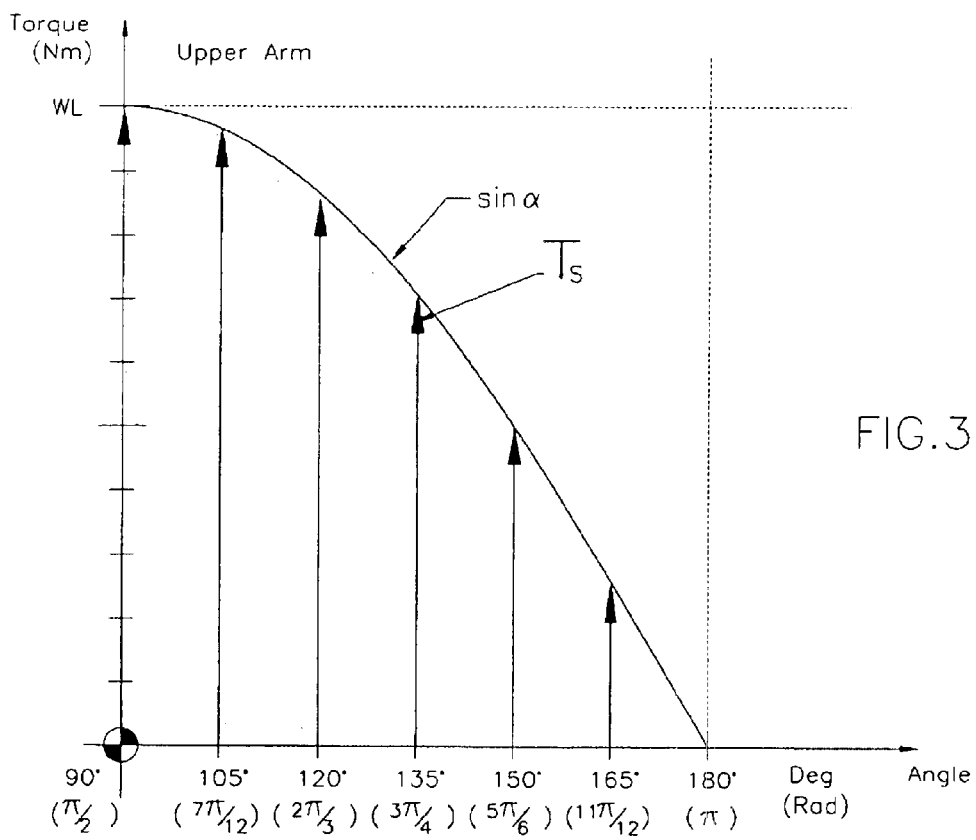
FIG. 3 is a graph of the torque imparted by the weights of the upper arm and the supported article on the middle arm joint as a function of the angular disposition of the upper arm.

As FIG. 3 shows, the torque imparted to the middle joint 16 by the combined weight of the upper support arm 14 and the weight of the supported article 22 is governed by the same formula such that it will follow a declining sine curve as the angle of disposition of the upper support arm 14 is varied between 90 and 180 degrees relative to vertical.

For each of the upper and lower support arms 14 and 12, therefore, it will be appreciated that the torque $T_s$ exacted by the spring or springs 26 and 24 in support of the arms 14 and 12 preferably should substantially mirror the torque $T_w$ imparted on the respective joint 16 or 18 if the springs 26 and 24 are to maintain the equipoise arm assembly 10 in a state of equipoise while allowing the angular disposition of the support arms 12 and 14 to be adjusted with the application of a very slight motive force. As noted previously, however, achieving such a resistance pattern with prior art mechanical spring arrangements has been generally unrealizable since the resistance provided by a standard spring will follow a linear pattern as governed by the spring constant. With that, prior art mechanical spring arrangements often provide too much or too little supportive resistance over some or all of the arm's range of motion thereby hindering the ability of the arms to achieve equipoise and forcing the arm design to require appreciable motive force to induce movement.

Figure 4:
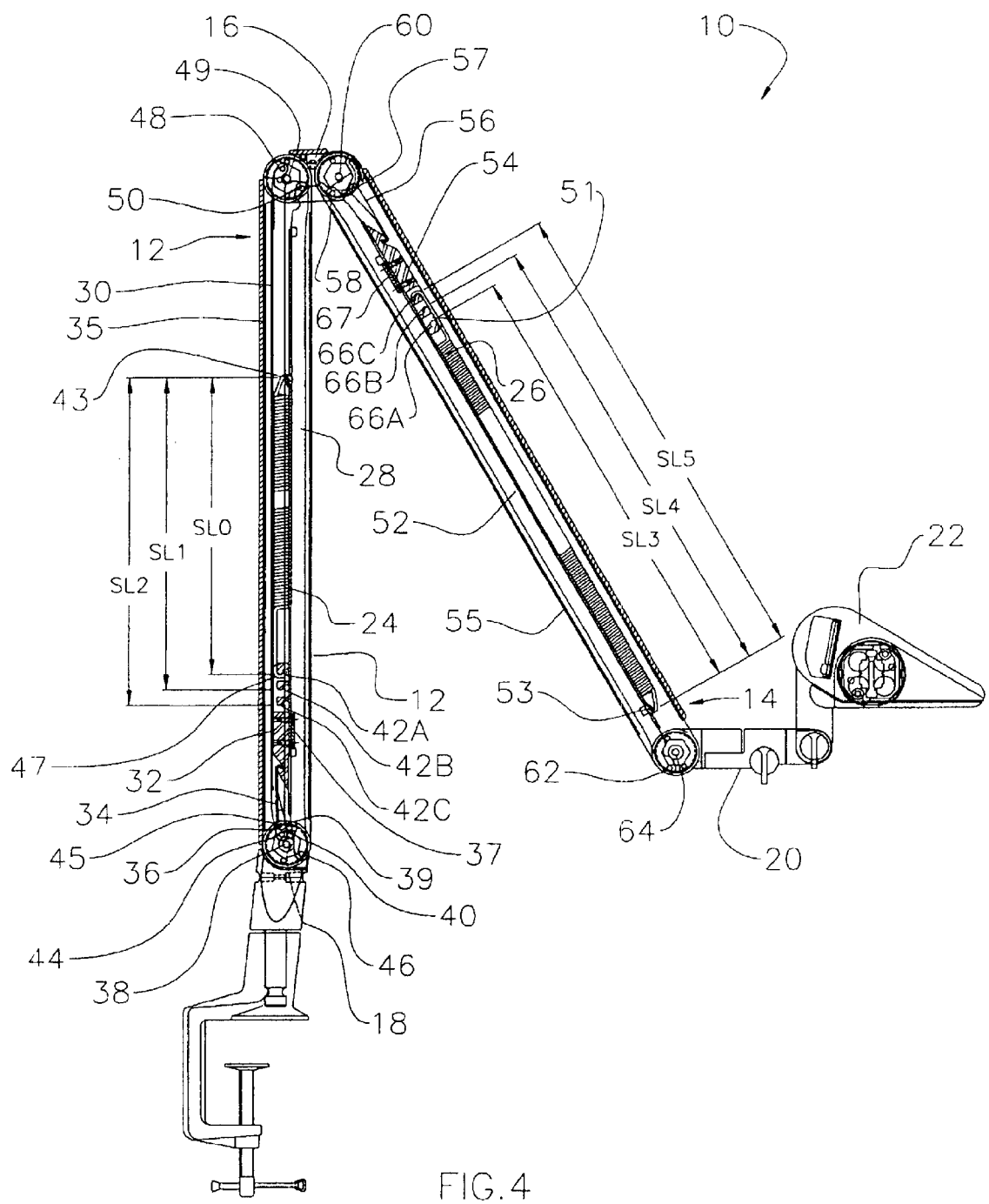
FIG. 4 is a sectioned view in side elevation of an equipoise arm assembly according to the present invention.

Advantageously, the present invention provides a solution that enables the torque ($T_s$) exerted by a spring or springs in a mechanical arm arrangement to match more closely the torque ($T_w$) imparted on the joint by the arm or arms and any supported article or articles. One embodiment of the present invention for an equipoise arm assembly 10 is shown in FIG. 4. There, one sees that the lower arm 12 of the equipoise arm assembly 10 pivots relative to the lower arm joint 18 about a proximal axis 38 while the middle joint 16 and the lower arm 12 pivot relative to one another at a distal axis 49. The lower arm 12 is formed with a first control arm 28 and a second control arm 30 that are pivotally coupled at their proximal ends to the lower arm joint 18 and at their distal ends to the middle joint 16. More particularly, the proximal end of the first control arm 28 is pivotally coupled to the lower arm joint 18 at a pivot axis 46, and the distal end of the first control arm 28 is pivotally coupled to the middle joint 16 at a pivot axis 50. Similarly, the proximal end of the second control arm 30 pivots relative to the lower arm joint 18 about a pivot axis 44 while the distal end of the second control arm 28 is pivotally coupled to the middle joint 16 at a pivot axis 48. As a result, the first and second control arms 28 and 30, the lower arm joint 18, and the middle joint 16 together form a parallelogram arrangement defined by the pivot axes 44, 46, 48, and 50 thereby enabling consistent orientation of the middle joint 16 relative to the lower arm joint 18 as will be elaborated on below.

The lower arm spring 24, which in this exemplary embodiment comprises a coil spring, provides counterbalancing support for the lower arm 12 by having a distal end 43 coupled to the body portion of the first control arm 28 and a proximal end 47 of the lower arm spring 24 effectively coupled to the lower arm joint 18. However, the proximal end 47 of the lower arm spring 24 is not directly coupled to the lower arm joint 18. Instead, in the embodiment of FIG. 4, the proximal end 47 of the lower arm spring 24 is coupled to a slidable coupler 32 at one of a plurality of coupling notches 42A, 42B, or 42C as will be described more fully below. In turn, the proximal end of the slidable coupler 32 is coupled to a distal end of a joining member 34 while a proximal end of the joining member 34 is pivotally coupled to a distal end of a pivot link 36. Finally, a proximal end of the pivot link 36 is pivotally connected to the lower arm joint 18 at the pivot axis 44.

One will note that, in this exemplary embodiment, the pivot link 36 and the second control arm 28 share the pivot axis 44. As will be described more fully herein, the pivot link 36 is able to pivot within what can be termed a pivot alcove 39 throughout a given range of pivoting until the pivot link 36 contacts a stop surface 40. A slider head 37 slidably retains the slidable coupler 32 relative to the first control arm 28 to prevent relative separation therebetween while allowing the lower arm spring 24 to provide its necessary support for the lower arm 12. A rigid lower arm housing 35 has an open inner volume that houses the first and second control arms 28 and 30 and the associated components of the lower arm 12.

The proximal end of the upper arm 14 pivots relative to the middle joint 16 at a pivot axis 60 while the distal end of the upper arm 14 pivots relative to the upper arm joint 20 at a pivot axis 64. Although it could certainly be formed with dual control arms, the upper arm 14 in this embodiment has a single control arm 52 with a proximal end pivotally coupled to the middle joint 16 at a pivot axis 58 and a distal end pivotally coupled to the upper arm joint 20 at a pivot axis 62. A parallelogram arrangement is effectively formed by the pivot axes 58, 60, 62, and 64 thereby ensuring that the upper arm joint 20 and thus the supported article 22 are consistently oriented relative to the middle joint 16 and, derivatively through the parallelogram arrangement of the lower arm 12, relative to the lower arm joint 18 and a supporting surface (not shown). A rigid upper arm housing 55 has an open inner volume housing the control arm 52 and the associated components of the upper arm 14.

The upper arm spring 26, which in this exemplary embodiment also comprises a coil spring, provides counterbalancing support for the upper arm 14 with a distal end 53 coupled to the body portion of the control arm 52 and a proximal end 51 retained relative to the upper arm housing 55 at a pivot axis 57. As with the lower arm spring 24, a slidable coupler 54 and a joining member 56 provide the pivotal coupling to the pivot axis 57. Again, the proximal end 51 of the upper arm spring 26 can be selectively coupled, such as by hooking or any other appropriate method, to the slidable coupler 54 at any one of a plurality of coupling notches 66A, 66B, or 66C while a slider head 67 slidably retains the slidable coupler 54 relative to the control arm 52 to prevent relative separation therebetween as the upper arm 14 is pivoted.

It should be noted that a second control arm could be included relative to the upper arm 14 if necessary or desirable for providing better stabilization. It would also be possible and within the scope of the invention to eliminate the second control arm 30 from the lower arm 12. Even further still, it will again be noted that just a lower arm 12 could be provided as could additional support arms beyond just the lower and upper arms 12 and 14.

Figure 5:
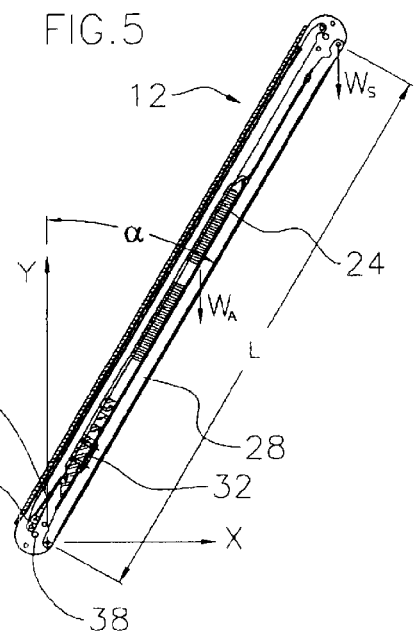
FIG. 5 is a sectioned view in side elevation of a lower arm depicting the forces, dimensional relations, and movements governing the balancing of the lower arm.
Figure 6:
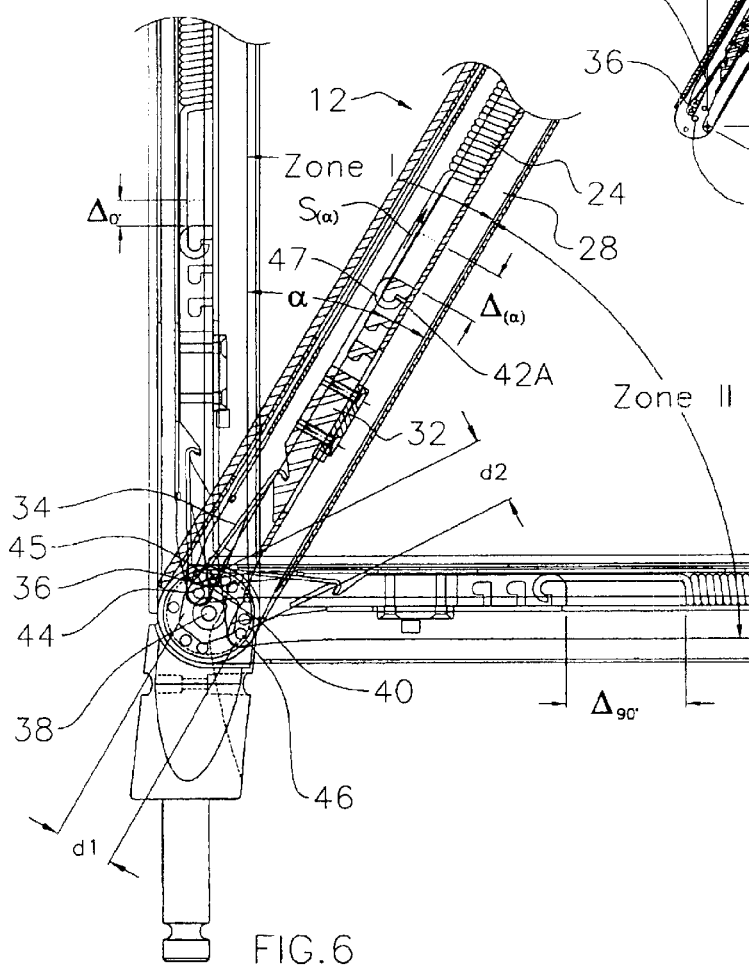
FIG. 6 is a dissected view in side elevation of a portion of the lower arm further depicting the forces, dimensional relations, and movements governing the balancing of the lower arm.

The forces, dimensional relations, and movements governing the balancing of the lower arm 12 can be viewed as is shown in FIGS. 5 and 6 where the lower arm 12 is shown in simplified form with just the first control arm 28. In FIG. 5, one sees that the lower arm 12 has a length L from the proximal pivot axis 38 to the distal pivot axis 49. The lower arm 12 has a weight $W_a$ that can be considered to act at a point along its mid-portion while the weight $W_s$ of the supported article 22 and, if provided, the upper arm 14 acts at the distal pivot axis 49. The lower arm 12 can pivot relative to the proximal pivot axis 38 through a pivot angle α relative to vertical ranging, for example, from 0 to 90 degrees. Together, the weights $W_a$ and $W_s$ will impart a torque $T_w$ or moment on the proximal pivot axis 38 that will be dependent on the angle α. Under the present arrangement, that torque $T_w$ can be determined by Formula 2.

$$T_w = W_s \cdot L \cdot \sin\alpha + W_a \cdot L \cdot \sin\alpha + W_a \cdot L/2 \cdot \sin\alpha \quad (2)$$

Formula 2 can be simplified as is shown below in Formula 3.

$$T_w = (W_s + 1.5 W_a) \cdot L \cdot \sin\alpha \quad (3)$$

Looking to FIG. 6, the lower arm spring 24 can be seen to be hooked onto a first coupling notch 42A such that it will have an initial spring extension $\Delta_0$ when the lower arm 12 is in a vertical orientation. The lower arm spring 24 will exert a spring force S on the slidable coupler 32. An angle β, which will vary as the lower arm 12 is rotated, is disposed between the joining member 34 and the first control arm 28. Throughout what can be termed Zone 1, the lower arm spring 24 will effectively pivot about the pivot axis 44. As a result, the moment arm m over which the spring force S will act relative to the pivot axis 46 of the first control arm 28 will be the distance $d_1$ between the pivot axes 44 and 46. However, at a given pivot angle, the pivot link 36 will rotate into contact with the stop surface 40 thereby preventing it from further pivoting. As a result, with a further pivoting of the lower arm 12 through what can be considered Zone II, the lower arm spring 24 will effectively pivot about the distal end 45 of the pivot link 36 such that the moment arm m over which the spring force S will act relative to the pivot axis 46 of the first control arm 28 will be the distance $d_2$ between the distal end 45 of the pivot link 36 and the pivot axis 46. Notably, the distance $d_2$ is greater than the distance $d_1$. The torque $T_s$ imparted by the lower arm spring 24 will be determined by Formula 4 below. As a result, it will be directly dependent on the moment arm m such that the torque $T_s$ will be proportionally increased with the increase of the moment arm from $d_1$ to $d_2$.

$$T_s = S \cdot m \quad (4)$$

To achieve the desired rotational equilibrium in the equipoise arm assembly 10, the total of all torques $\Sigma T$ about the pivot axis 46 should equal zero. Therefore, the counterclockwise torque $T_s$ exerted by the lower arm spring 24 should substantially equal the clockwise torque $T_w$ exerted by the weights $W_a$ and $W_s$. Advantageously, by employing the pivoting link arrangement of the present invention to adjust the effective pivot point of the lower arm spring 24, the torque $T_s$ exerted by the lower arm spring 24 can be made to follow a non-linear, escalating path corresponding more closely to the non-linear, escalating torque $T_w$ exerted by the weights $W_a$ and $W_s$. With that, the arm assembly 10 can be maintained in a state of equipoise more effectively.

Figure 7:
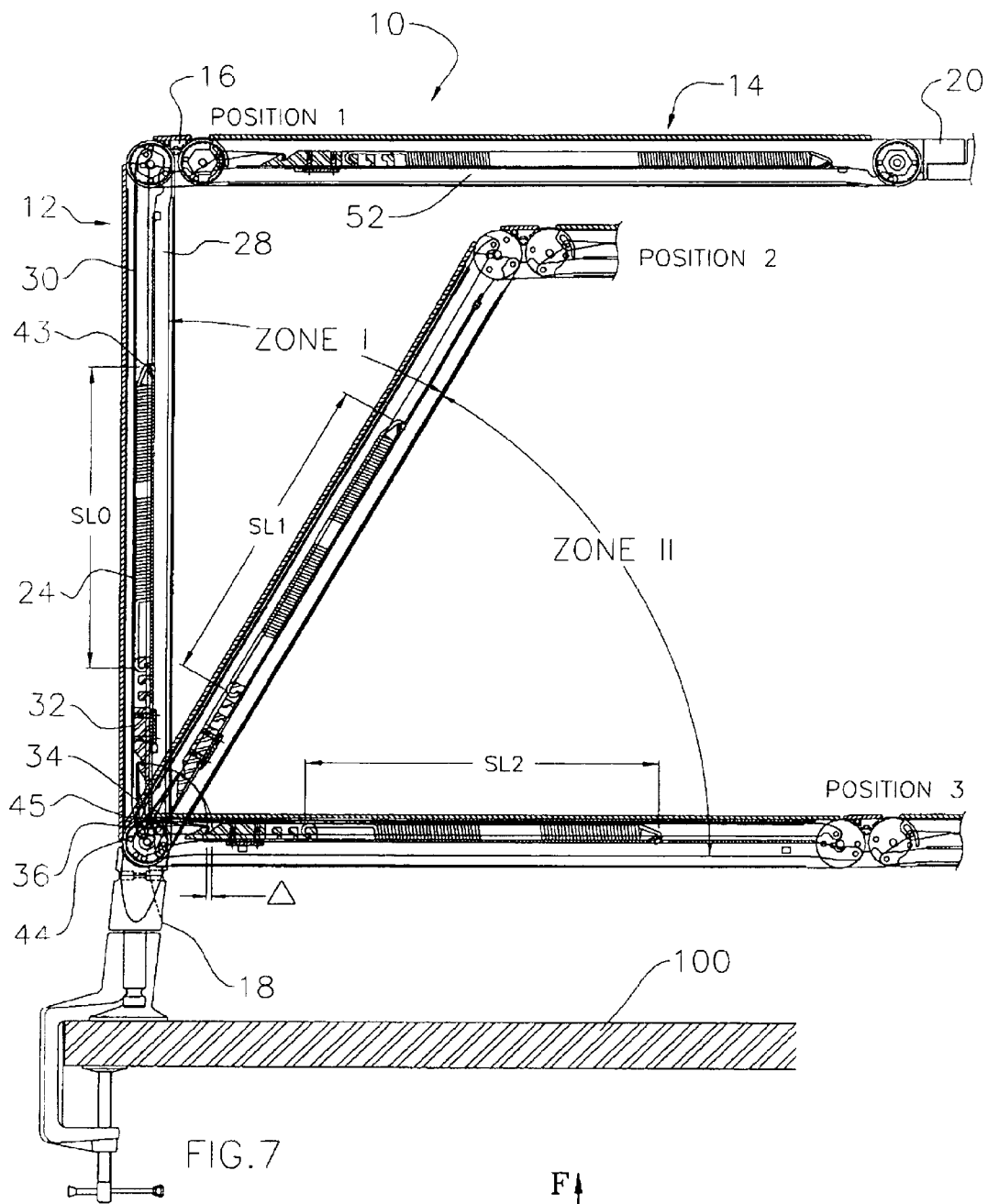
FIG. 7 is a sectioned view in side elevation of a double arm embodiment of the equipoise arm assembly in first, second, and third positions.

In addition to the changing moment arm m and torque $T_s$, the changing pivot axis in this exemplary arrangement also yields a modified extension pattern for the lower arm spring 24. The effect of the exemplary means for producing a changing pivot axis can be appreciated further with reference to FIG. 7 where the equipoise arm assembly 10 is shown coupled to a support surface 100, such as a desk, in a first position with the lower arm 12 vertically disposed, a second position with the lower arm 12 rotated to the end of Zone 1, and a third position with the lower arm 12 pivoted through Zone II to 90 degrees away from vertical. In the first position, the lower arm spring 24 has an initial spring length $SL_0$. As the lower arm 12 is rotated to the second position, the distance between the pivot axis 44 and the distal end 43 of the lower arm spring 24 will progressively increase such that the lower arm spring 24 will be progressively extended to a second length $SL_1$. With that, the lower arm spring 24 will impart progressively increasing torque $T_s$. Beyond the second position, the lower arm spring 24 will pivot about the distal end 45 of the pivot link 36 thereby not only changing the moment arm m but also altering the extension pattern of the lower arm spring 24 such that the lower arm spring 24 will be extended by a progressively greater amount than it would be extended if it continued to pivot about the pivot axis 44.

Figure 8:
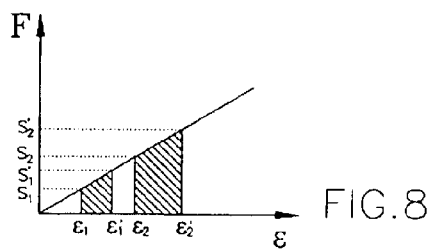
FIG. 8 is a graph of the differences in spring extension and resultant spring force for first and second orientations within Zone II.

For example, FIG. 8 shows the differences in spring extension $\epsilon$ and resultant spring force S for first and second orientations within Zone II. With that altered extension pattern and the added spring extension $\Delta_{SL}$, the lower arm spring 24 will impart a torque $T_s$ over Zone II greater than it otherwise would. The torque $T_s$ exhibited by the lower arm spring 24 can thus be made to follow a non-linear pattern that even more closely matches the non-linear pattern of the torque $T_w$ imparted by the weights $W_a$ and $W_s$. With these combined effects, the lower arm 12 of the arm assembly 10 can be better maintained in equipoise.

Figure 9:
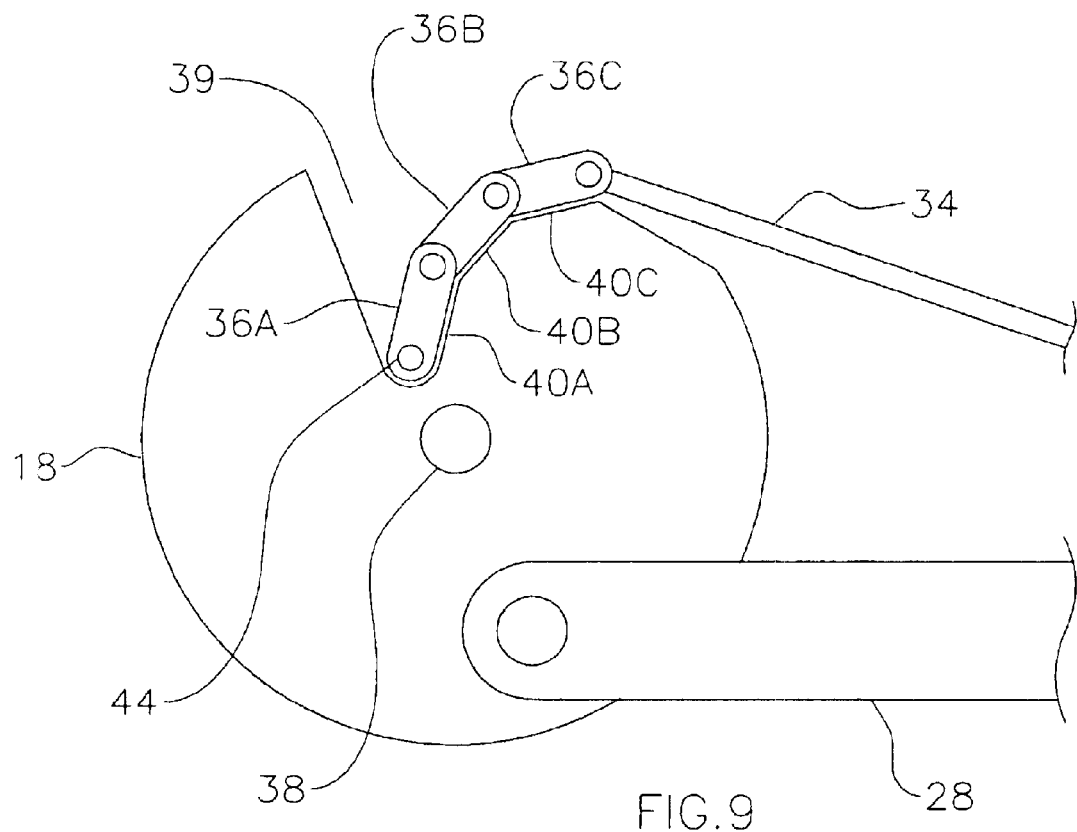
FIG. 9 is a view in side elevation of an alternative pivoting arrangement according to the present invention.

Although a single pivot link 36 certainly can be used to great advantage as described above, certain embodiments of the equipoise arm assembly 10 can employ multiple pivot links 36 to allow the torque pattern exhibited by the lower arm spring 24 to be further modified. By way of example, in the embodiment of FIG. 9, the joining member 34 is coupled to the lower arm joint 18 by first, second, and third pivot links 36A, 36B, and 36C, which in this case are rigid chain links, that can pivot within the pivot alcove 39 through a given zone of pivoting until contacting their respective stop surface subsection 40A, 40B, or 40C. More particularly, as the lower arm 12 pivots away from vertical, it will pass through a first zone wherein the lower arm spring 24 will effectively pivot about the proximal end of the first pivot link 36A. At a given degree of rotation, the first pivot link 36A will pivot into contact with the first stop surface 40A whereby the lower arm 12 will enter a second zone in which the lower arm spring 24 will effectively pivot about the proximal end of the second pivot link 40B. A third zone will be entered wherein the lower arm spring 24 will effectively pivot about the proximal end of the third pivot link 36C as the second pivot link 40B makes contact with the second stop surface 40B, and a fourth zone wherein the lower arm spring 24 will effectively pivot about the distal end of the third pivot link 36C will be entered when the third pivot link 36C makes contact with the third stop surface 40C. With the resulting multiplicity of moment arms m, the pattern of the spring force S can be further refined to provide a non-linear torque pattern that matches most closely the torque required to maintain the lower arm 12 in perfect equipoise. Of course, further or fewer pivot links 36 can be provided within the scope of the invention.

Figure 10:
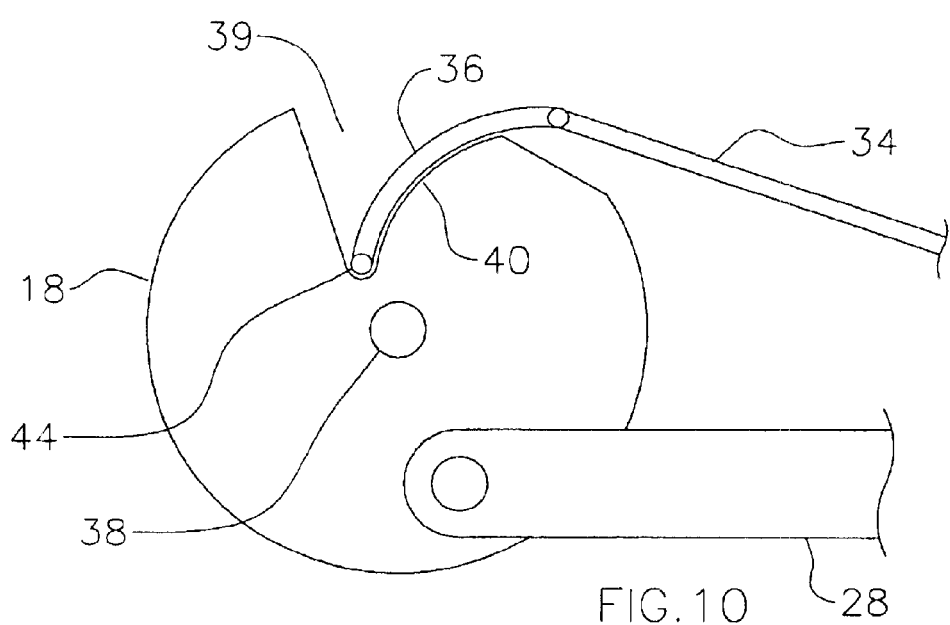
FIG. 10 is a view in side elevation of another alternative pivoting arrangement according to the present invention.

A further alternative embodiment of the pivoting arrangement is shown in FIG. 10. There, the pivot link 36 comprises a flexible member and the stop surface 40 comprises a generally smooth, variably sloped surface. With that, the lower arm spring 24 will begin by effectively pivoting about the pivot axis 44 that comprises the proximal end of the pivot link 36. As the lower arm 12 is pivoted about the pivot axis 38, however, the flexible pivot link 36 will progressively make contact with the stop surface 40 in increasing proportion thereby creating a continuously moving effective pivot axis. With that, the pattern of the spring force S can be varied infinitely to provide a torque pattern that substantially precisely matches the escalating sinusoidal torque pattern required for maintaining the lower arm 12 in equipoise.

Bearing in mind the torque graphs of FIGS. 2 and 3, one will note that the goals of the equipoise arm designer in crafting an arm, such as the upper arm 14, that is to have a range of pivoting that includes all or part of the angular range between 90 and 180 degrees relative to vertical are opposite in many respects to the goals of the designer in crafting an arm, such as the lower arm 12, that is to have a range of pivoting that includes all or part of the angular range between 0 and 90 degrees relative to vertical. While one seeking to achieve equipoise in an arm pivoting between 0 and 90 degrees will seek to match the increasing sinusoidal torque pattern of FIG. 2, one seeking to achieve equipoise in an arm pivoting between 90 and 180 degrees relative to vertical will seek to match the decreasing sinusoidal torque pattern of FIG. 3. The present inventor has appreciated that, when seeking to maintain the upper arm 14 in equipoise, the added spring extension and increased moment arm m that were sought relative to the lower arm 12 should be replaced with decreased spring tension and a decreasing moment arm m as the upper arm 14 pivots from 90 and 180 degrees.

Advantageously, the arrangement of the upper arm 14 disclosed herein achieves these objectives. In the embodiment shown, for example, in FIG. 4, it will again be noted that the proximal end 51 of the upper arm spring 26 is coupled to a pivot axis 57 by a slidable coupler 54 and a joining member 56. However, the pivot axis 57 to which the proximal end of the upper arm spring 26 is effectively coupled is not fixed in relation to the middle joint 16. Instead, the pivot axis 57 is disposed on the upper arm housing 55, which, of course, pivots with the upper arm 14 in general. As such, the pivot axis 57 moves relative to the middle joint 16 and, therefore, relative to the pivot axis 58 about which pivots the control arm 52. With this, as will be discussed further below, the moment arm m over which the spring force S acts varies over the range of motion of the upper arm 14. Furthermore, by tending to travel with the distal end 53 of the upper arm spring 26, the extension of the upper arm spring 26 is reduced as compared to an arrangement wherein the proximal end of a spring is fixed relative to an arm joint.

Figure 11:
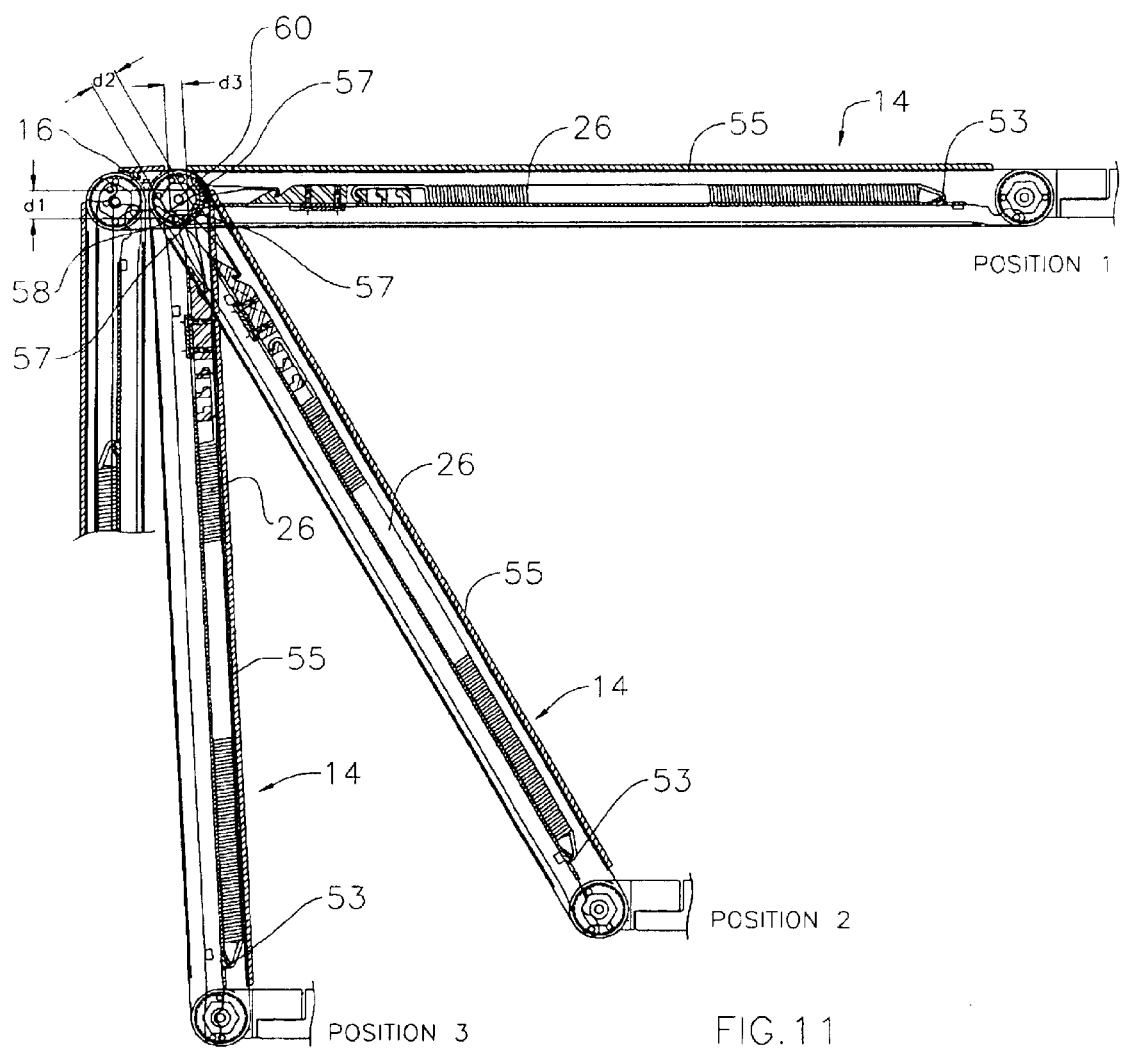
FIG. 11 is a view in side elevation of a pivoting arrangement suited to an equipoise arm assembly that is to pivot through all or part of the angular range of 90 to 180 degrees.

The effect of the disclosed location of the pivot axis 57 can be appreciated with further reference to FIG. 11. There, a simplified version of the upper arm 14 is shown in first, second, and third positions. In Position 1, the moment arm m over which the spring force S acts is the perpendicular distance $d_1$ between the pivot axis 57 and the pivot axis 58. However, in Position 2, because the pivot axis 57 has moved with the arm casing 55, the moment arm m over which the spring force S acts has been reduced to the perpendicular distance $d_2$ between the pivot axis 57 and the pivot axis 58. Finally, the pivot axis 57 in Position 3 has moved still further with the arm casing 55 such that the moment arm m over which the spring force S acts has been reduced still further to the distance $d_2$.

Since the torque $T_s$ imparted by the upper arm spring 26 is proportionally dependent on the moment arm m, the torque $T_s$ per unit spring force S becomes proportionally less as the moment arm m is reduced from, for example, $d_1$ to $d_3$ and therebetween. In conjunction with the tendency of the pivot axis 57 to move relative to the middle joint 16, the progressive reduction of the moment arm m can enable the pattern of torque $T_s$ imparted by the upper arm spring 26 to decline progressively to mirror or at least more closely correspond to the declining torque $T_w$ pattern imparted by the weights of the upper arm 14 and the supported article 22 as the arm is pivoted within the range of 90 to 180 degrees relative to vertical. With this, the upper arm spring 26 can impart adequate torque $T_s$ to maintain equipoise when the upper arm 14 is at or near horizontal or 90 degrees as in Position 1 while also avoiding or at least minimizing imparting excessive torque when the upper arm 14 is at or near 180 degrees as in Position 3.

Looking again to FIG. 4, one will again note that the proximal end 47 of the lower arm spring 24 can be coupled to the slidable coupler 32 at any one of a plurality of coupling notches 42A, 42B, or 42C or other coupling points to have varying initial spring lengths SL0, SL1, or SL2. Similarly, the proximal end 51 of the upper arm spring 26 can be selectively coupled to the slidable coupler 54 at any one of a plurality of coupling notches 66A, 66B, or 66C or other coupling points to have varying initial spring lengths SL3, SL4, or SL5. Under such an arrangement, the equipoise arm assembly 10 can be readily adapted to maintain supported articles 22 of varying weights in equipoise. Indeed, within a given range, the same arm springs 24 and 26 can be employed to support differently weighted supported articles 22 by a selective coupling of the proximal ends 47 and 51 with the slidable couplers 32 and 54. For example, a given arm spring 24 can be coupled to the slidable coupler 32 at the first coupling notch 42A to support a supported article 22 of a given weight, and the same arm spring 24 can be coupled at the second or third coupling notches 42B or 42C to support supported articles 22 of progressively heavier weights. With this, a manufacturer or assembler can craft equipoise arm assemblies 10 particularly adapted for supporting variously weighted articles 22 while retaining a minimum of different spring types on hand.

Figure 12:
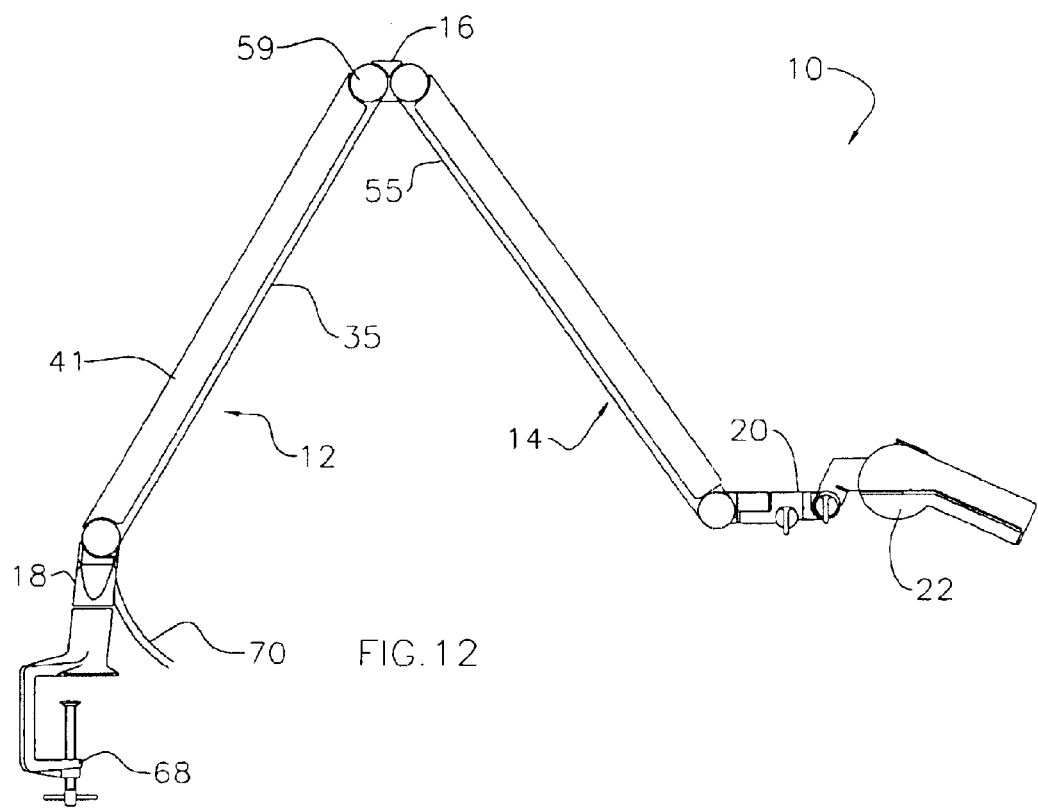
FIG. 12 is a view in side elevation of a double arm embodiment of the equipoise arm assembly.

With this, embodiments of the equipoise arm assembly 10 can be designed and crafted to support substantially any article. For example, a double arm embodiment of the equipoise arm assembly 10 is shown in FIG. 12 where the supported article 22 comprises a magnifying lamp, which is also indicated at 22. Since electrical power must typically be provided to the magnifying lamp 22 by a power cord 70, the power cord 70 advantageously can travel through and be retained within the open inner volumes defined by the respective arm housings 35 and 55 of the lower and upper support arms 12 and 14. With that, the arm assembly 10 can remain aesthetically pleasing while providing utilitarian power to the magnifying lamp 22. In this embodiment, the arm assembly 10 can itself be retained relative to a support surface (not shown), such as a desk, a table, a counter, or any other surface, by a clamping mechanism 68 that is rotatably coupled to the lower arm joint 18.

Figure 13:
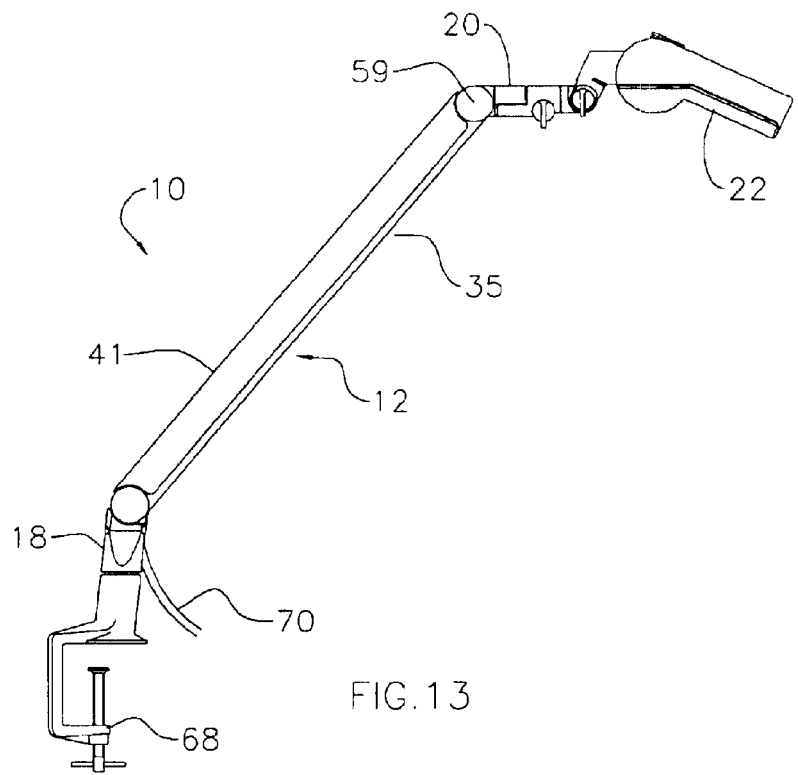
FIG. 13 is a view in side elevation of a single arm embodiment of the equipoise arm assembly.

Of course, the equipoise arm assembly 10 can alternatively pursue a single arm embodiment as is exemplified in FIG. 13. There, the equipoise arm assembly 10 has just a lower arm 12 for supporting a supported article 22 for parallel movement relative to a support surface. A power cord 70 can again be encased within the open inner volume of the lower arm 12, and the arm assembly 10 can again be retained by a clamping mechanism 68.

Figure 14:
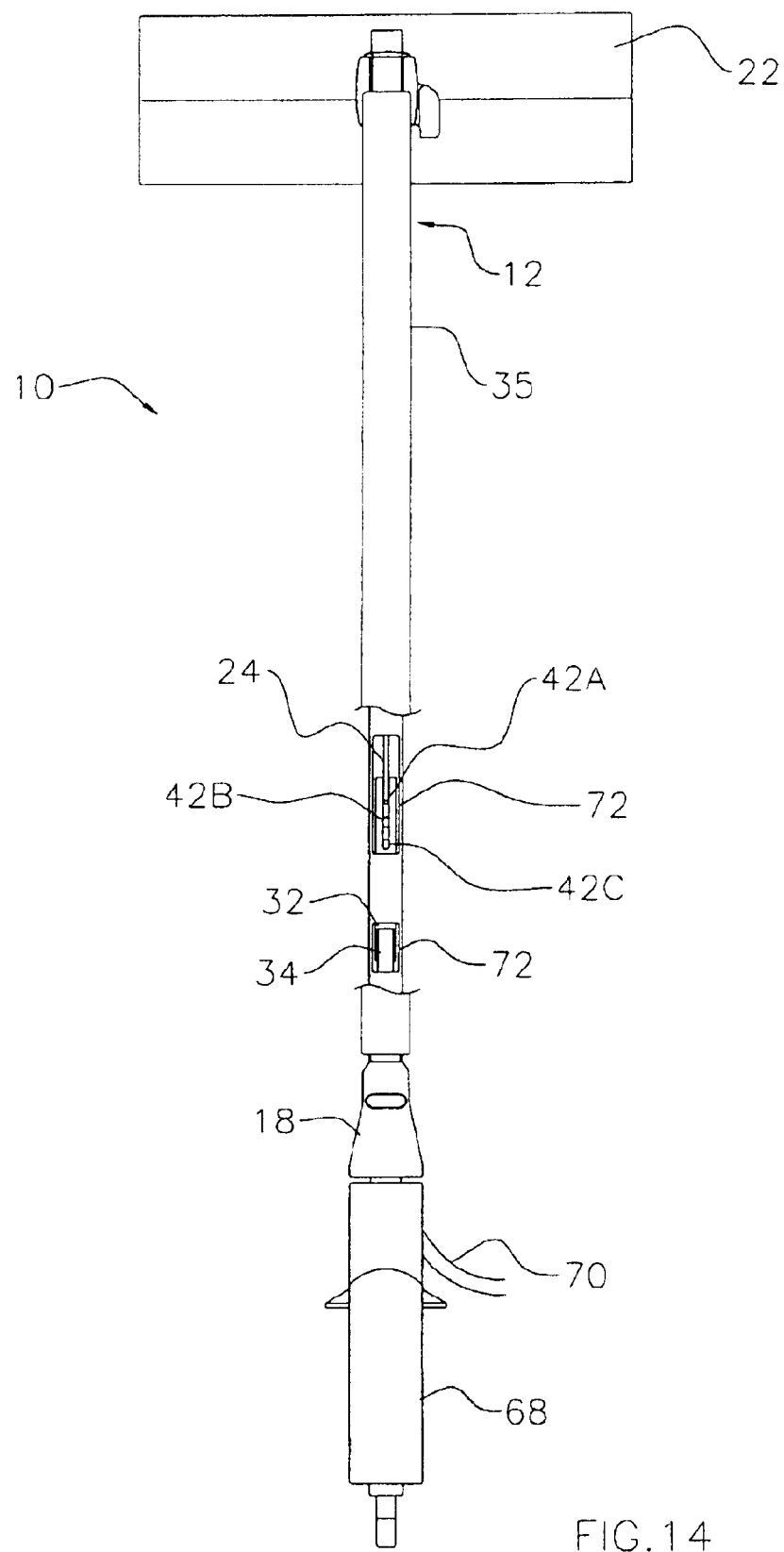
FIG. 14 is a view in rear elevation of the single arm equipoise arm assembly of FIG. 12.

As is shown in FIG. 14 relative to the lower arm 12 in the single arm equipoise arm assembly 10, one sees that the equipoise arm assembly 10 can include windows 72 in the arm housings 35 and 55 for enabling access to the arm springs 24 and 26. With that, the proximal end of the arm springs 24 and 26 can be adjusted to be coupled to any one of the plurality of coupling points 42A, 42B, and 42C or 66A, 66B, and 66C. With this, the initial spring deflection can be adjusted, and the equipoise arm assembly 10 can be adapted to retain differently weighted articles still more conveniently.

Figure 15:
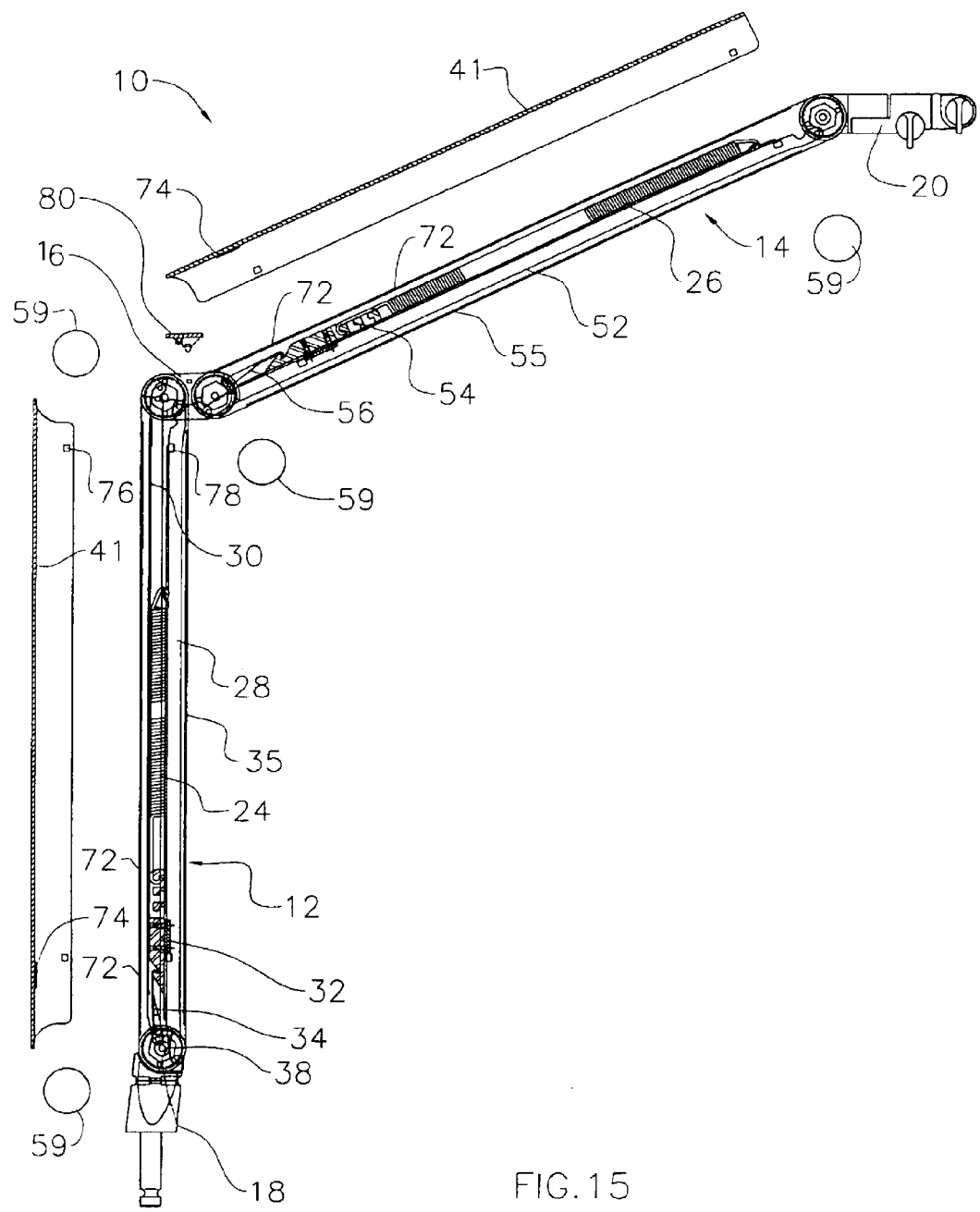
FIG. 15 is a partially exploded view in side elevation of a further embodiment of the equipoise arm assembly.

A further embodiment of the invention is shown in FIG. 15 where the equipoise arm assembly 10 again has a lower arm 12 pivotally coupled to an upper arm 14 by a middle joint 16 for enabling parallel movement of an upper arm joint 20 relative to a lower arm joint 18 and a support surface (not shown). The lower arm 12, which is designed to pivot, for example, from 0 to 90 degrees relative to vertical, has a rigid lower arm housing 35 with an open inner volume encasing first and second control arms 28 and 30 and a lower arm spring 24 that is coupled at a distal end to the first control arm 28 and at a second end to the lower arm joint 18 by a pivot link 38, a slidable coupler 32, and a joining member 34. The upper arm 14, which is designed to pivot, for example, from roughly 65 to 180 degrees from vertical, has a rigid upper arm housing 55 with an open inner volume that encases a control arm 52 and an upper arm spring 26 that is coupled at a distal end to the control arm 52 and at a proximal end to the upper arm housing 55.

The arm housings 35 and 55 each have windows 72 in what can be considered the dorsal side thereof for providing access to the springs 24 and 26, the slidable couplers 32 and 54, and the joining members 34 and 56 to allow the proper connection thereof to be ensured and to enable the selective coupling of the springs 24 and 26 with the slidable couplers 32 and 54. Removable and replaceable casing shells 41, each with first and second side walls and a spine, can be pressed over each of the arm housings 35 and 55 for improving the appearance of the equipoise arm assembly 10, for covering the windows 72, and for otherwise helping to protect the operator from moving parts including the joints between the upper and lower arms 14 and 12 and the upper, lower, and middle arm joints 20, 18, and 16. Further protection and aesthetic improvement is provided by annular joint caps 59 that can be snap fit into place over each side of the joints between the upper and lower arms 14 and 12 and the upper, lower, and middle arm joints 20, 18, and 16. Still further, a wedge shield 80 can be snapped into place on the middle arm joint 16 between the joints between the upper and lower arms 14 and 12 and the middle arm joints 16. The casing shells 41 each have protuberances 74 on the spine thereof for engaging one or both windows 72 to ensure a proper alignment of the casing shells 41 with the arm housings 35 and 55, and either or both side walls of the casing shells 41 have protuberances thereon for engaging apertures 78 on the walls of the arm housings 35 and 55 to secure the casing shells 41 in place. Where necessary, a power cord (not shown) can be threaded through the arm housings 35 and 55 adjacent to what can be considered the ventral sides thereof.

Based on the foregoing, one will appreciate that the present invention for an equipoise arm assembly 10 achieves a plurality of advantages over the prior art. Most basically, with the counterbalancing force of the lower arm spring 24 and, if an upper arm 14 is provided, the upper arm spring 26, the equipoise arm assembly 10 can support an article 22 in equipoise over a broad range of support angles. In particular embodiments, the pattern of resistive support provided by the equipoise arm assembly 10 can be adapted to correspond to the non-linear changes in the moment arm presented by the support arm 12 or support arms 12 and 14 over a given range of motion. By providing such a tailored pattern of resistive support, embodiments of the arm assembly 10 can be crafted wherein the motive force required to move the arm 12 or arms 12 and 14 from equipoise position to equipoise position is minimal. Even further, by providing multiple coupling points 42A, 42B, 42C, 66A, 66B, and 66C for the upper and lower arm springs 24 and 26, the equipoise arm assembly 10 can be readily adapted to support articles 22 of differing weights. Also, certain embodiments of the equipoise arm assembly 10 can employ the arm housings 35 and 55 to retain power cords 70 and the like shielded from view and damage while also protecting an operator's body parts and other surrounding elements from being harmed by the moving components of the arm 12 or arms 12 and 14. While not every embodiment of the equipoise arm assembly 10 will need or seek to achieve all such advantages, it will be appreciated that embodiments of the equipoise arm assembly 10 achieving one or more of the described advantages will represent a marked advance in the art.

With a plurality of exemplary embodiments of the present invention for an equipoise arm assembly 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also equivalents thereof.

What is claimed is:

1. An equipoise arm assembly for supporting an article in equipoise, the equipoise arm assembly comprising:
    a support arm with a body portion with a proximal end and a distal end;
    a proximal arm joint pivotally coupled to the proximal end of the support arm at a proximal pivot axis;
    a means for supporting an article relative to the distal end of the support arm;
    a spring arrangement with a distal end coupled to the body portion of the support arm and a proximal end pivotable about an effective pivot axis spaced a given distance from the proximal pivot axis to create a spring force moment arm of a given length whereby the spring arrangement will tend to provide a resistive torque in support of the support arm against rotation in a given direction wherein the spring arrangement includes a spring member with a proximal end and a distal end; and
    a means for altering the distance between the effective pivot axis of the spring arrangement and the proximal pivot axis of the support arm during a pivoting of the support arm to change the length of the spring force moment arm thereby to change the resistive torque per unit spring force provided by the spring arrangement in support of the support arm wherein the means for altering the distance between the effective pivot axis and the proximal pivot axis comprises a stop surface disposed adjacent to a portion of the spring arrangement in combination with an open area adjacent to the stop surface wherein the support arm can be pivoted through a given range of pivoting wherein the portion of the spring arrangement will pivot through at least part of the open area until the portion of the spring arrangement contacts the stop surface thereby to prevent further pivoting of at least part of the portion of the string arrangement whereby the effective pivot axis of the spring arrangement and the spring force moment arm will be altered.

2. The equipoise arm assembly of claim 1 wherein the means for altering the distance between the effective pivot axis and the proximal pivot axis to change the length of the spring force moment arm creates a non-linear resistive torque pattern that corresponds more than a linear resistive torque pattern would to the non-linear torque pattern imparted on the proximal arm joint by the weights of the support arm and the article over a range of pivoting of the support arm.

3. The equipoise arm assembly of claim 1 wherein the spring arrangement includes a pivot link coupled to the proximal arm joint wherein the stop surface and the open area are disposed adjacent to the pivot link whereby the pivot link can be pivoted through a given range of pivoting until at least a portion of the pivot link makes contact with at least a portion of the stop surface whereby that at least a portion of the pivot link will be prevented from further pivoting whereby the effective pivot axis of the spring arrangement and the spring force moment arm will be altered.

4. The equipoise arm assembly of claim 3 wherein the pivot link comprises a flexible member.

5. The equipoise arm assembly of claim 4 wherein the stop surface is variably sloped whereby the pivot link will progressively make increasing contact with the stop surface as the support arm is pivoted thereby creating a moving effective pivot axis for the spring arrangement.

6. The equipoise arm assembly of claim 3 wherein the spring arrangement includes multiple pivot links.

7. The equipoise arm assembly of claim 6 wherein the stop surface is variably sloped whereby the pivot links will make sequential contact with the stop surface as the support arm is pivoted thereby creating a moving effective pivot axis for the spring arrangement.

8. The equipoise arm assembly of claim 7 wherein the pivot links are rigid and wherein the stop surface has a plurality of variably sloped subsections for contacting a plurality of the pivot links.

9. The equipoise arm assembly of claim 3 wherein the open area comprises a pivot alcove in the proximal arm joint.

10. The equipoise arm assembly of claim 1 wherein the means for altering the distance between the effective pivot axis and the proximal pivot axis operates to increase the distance between the effective pivot axis and the proximal pivot axis during a pivoting of the support arm to increase the length of the spring force moment arm thereby to increase the resistive torque per unit spring force provided by the spring arrangement in support of the support arm.

11. The equipoise arm assembly of claim 1 wherein the means for retaining an article relative to the distal end of the support arm comprises a distal arm joint pivotally coupled to the distal end of the support arm at a distal pivot axis.

12. The equipoise arm assembly of claim 11 wherein a parallelogram pivoting arrangement is established between the support arm and the proximal and distal arm joints whereby the distal arm joint will demonstrate parallel movement relative to the proximal arm joint.

13. The equipoise arm assembly of claim 12 wherein the parallelogram pivoting arrangement is provided by first and second control arms and the proximal and distal arm joints wherein each control arm has a proximal end pivotally coupled to the proximal arm joint and a distal end pivotally coupled to the distal arm joint.

14. The equipoise arm assembly of claim 13 further comprising an arm housing with an open inner volume for housing at least a portion of the spring arrangement and at least a portion of the first control arm.

15. The equipoise arm assembly of claim 14 wherein the arm casing has at least one window therein for enabling an exposure and accessing of a portion of the spring arrangement.

16. The equipoise arm assembly of claim 12 wherein the parallelogram pivoting arrangement includes at least a first control arm and wherein the distal end of the spring arrangement is coupled to the first control arm.

17. The equipoise arm assembly of claim 11 wherein the support arm comprises a first support arm and further comprising a second support arm with a body portion, a proximal end pivotally coupled to the distal arm joint to pivot about a proximal pivot axis, and a distal end pivotally coupled to a second distal arm joint and further comprising a means for supporting an article relative to the second distal arm joint whereby the second support arm, the second distal arm joint, and the means for supporting an article relative to the second distal arm joint comprise the means for supporting the article relative to the distal end of the first support arm.

18. The equipoise arm assembly of claim 17 further comprising a spring arrangement with a distal end coupled to the body portion of the second support arm and a proximal end pivotable about an effective pivot axis spaced a given distance from the proximal pivot axis of the second support arm to create a spring force moment arm of a given length whereby the spring arrangement will tend to provide a resistive torque in support of the second support arm against rotation in a given direction wherein the spring arrangement includes a spring member with a proximal end and a distal end and further comprising a means for altering the distance between the effective pivot axis of the spring arrangement and the proximal pivot axis of the second support arm during a pivoting of the second support arm to change the length of the spring force moment arm thereby to change the resistive torque per unit spring force provided by the spring arrangement in support of the second support arm.

19. An equipoise arm assembly for supporting an article in equipoise, the equipoise arm assembly comprising:

a first support arm with a body portion with a proximal end and a distal end;

a proximal arm joint pivotally coupled to the proximal end of the first support arm at a proximal pivot axis;

a means for supporting an article relative to the distal end of the first support arm comprising a distal arm joint pivotally coupled to the distal end of the support arm at a distal pivot axis;

a spring arrangement with a distal end coupled to the body portion of the first support arm and a proximal end pivotable about an effective pivot axis spaced a given distance from the proximal pivot axis to create a spring force moment arm of a given length whereby the spring arrangement will tend to provide a resistive torque in support of the first support arm against rotation in a given direction wherein the spring arrangement includes a spring member with a proximal end and a distal end;

a means for altering the distance between the effective pivot axis of the spring arrangement and the proximal pivot axis of the first support arm during a pivoting of the first support arm to change the length of the spring force moment arm thereby to change the resistive torque per unit spring force provided by the spring arrangement in support of the first support arm;

a second support arm with a body portion, a proximal end pivotally coupled to the distal arm joint to pivot about a proximal pivot axis, and a distal end pivotally coupled to a second distal arm joint and further comprising a means for supporting an article relative to the second distal arm joint whereby the second support arm, the second distal arm joint, and the means for supporting an article relative to the second distal arm joint comprise the means for supporting the article relative to the distal end of the first support arm;

a spring arrangement with a distal end coupled to the body portion of the second support arm and a proximal end pivotable about an effective pivot axis spaced a given distance from the proximal pivot axis of the second support arm to create a spring force moment arm of a given length whereby the spring arrangement will tend to provide a resistive torque in support of the second support arm against rotation in a given direction wherein the spring arrangement includes a spring member with a proximal end and a distal end and further comprising a means for altering the distance between the effective pivot axis of the spring arrangement and the proximal pivot axis of the second support arm during a pivoting of the second support arm to change the length of the spring force moment arm thereby to change the resistive torque per unit spring force provided by the spring arrangement in support of the second support arm;

wherein the second support arm comprises a control arm that pivots about the proximal pivot axis of the second support arm and a disparate member that pivots relative to the proximal arm joint with the control arm and wherein the means for altering the distance between the effective pivot axis of the spring arrangement and the proximal pivot axis of the second support arm during a pivoting of the second support arm comprises a coupling of the proximal end of the spring arrangement to the disparate member.

20. The equipoise arm assembly of claim 19 wherein the means for altering the distance between the effective pivot axis and the proximal pivot axis operates to decrease the distance between the effective pivot axis and the proximal pivot axis during a pivoting of the second support arm to decrease the length of the spring force moment arm.

21. An equipoise arm assembly for supporting an article in equipoise, the equipoise arm assembly comprising:

a support arm with a body portion with a proximal end and a distal end;

a proximal arm joint pivotally coupled to the proximal end of the support arm at a proximal pivot axis;

a means for supporting an article relative to the distal end of the support arm;

a spring arrangement with a distal end coupled to the body portion of the support arm and a proximal end pivotable about an effective pivot axis spaced a given distance from the proximal pivot axis to create a spring force moment arm of a given length whereby the spring arrangement will tend to provide a resistive torque in support of the support arm against rotation in a given direction wherein the spring arrangement includes a spring member with a proximal end and a distal end; and a means for altering the distance between the effective pivot axis of the spring arrangement and the proximal pivot axis of the support arm during a pivoting of the support arm to change the length of the spring force moment arm thereby to change the resistive torque per unit spring force provided by the spring arrangement in support of the support arm wherein the means for altering the distance between the effective pivot axis and the proximal pivot axis to change the length of the spring force moment arm creates a non-linear resistive torque pattern that corresponds more than a linear resistive torque pattern would to the non-linear torque pattern imparted on the proximal arm joint by the weights of the support aim and the article over a range of pivoting of the support arm and wherein the means for altering the distance between the effective pivot axis and the proximal pivot axis to change the length of the spring force moment arm alters the effective pivot axis of the spring arrangement to create a non-linear resistive torque pattern that generally corresponds to a pattern established by the following formula:

$$T_s = (W_s + 1.5 W_a) \cdot L \cdot \sin \alpha$$

where $T_s$ is the torque imparted by the spring arrangement, $W_s$ is the cumulative weight of the article and any other elements supported by the support arm, $W_a$ is the weight of the support arm, L is the length of the support arm, and $\alpha$ is the angle between the support arm and vertical.

22. An equipoise arm assembly for supporting an article in equipoise, the equipoise arm assembly comprising:

a support arm with a body portion with a proximal end and a distal end;

a proximal arm joint pivotally coupled to the proximal end of the support arm at a proximal pivot axis;

a means for supporting an article relative to the distal end of the support arm;

a spring arrangement with a distal end coupled to the body portion of the support arm and a proximal end pivotable about an effective pivot axis spaced a given distance from the proximal pivot axis to create a spring force moment arm of a given length whereby the spring arrangement will tend to provide a resistive torque in support of the support arm against rotation in a given direction wherein the spring arrangement includes a spring member with a proximal end and a distal end; and a means for altering the distance between the effective pivot axis of the spring arrangement and the proximal pivot axis of the support arm during a pivoting of the support arm to change the length of the spring force moment arm thereby to change the resistive torque per unit spring force provided by the spring arrangement in support of the support arm;

wherein the support arm comprises a control arm that pivots about the proximal pivot axis and a disparate member that pivots relative to the proximal arm joint with the control arm and wherein the means for altering the distance between the effective pivot axis of the spring arrangement and the proximal pivot axis of the support arm during a pivoting of the support arm comprises a coupling of the proximal end of the spring arrangement to the disparate member.

23. The equipoise arm assembly of claim 22 wherein the means for altering the distance between the effective pivot axis and the proximal pivot axis operates to decrease the distance between the effective pivot axis and the proximal pivot axis during a pivoting of the support arm to decrease the length of the spring force moment arm.

24. The equipoise arm assembly of claim 23 wherein the disparate member comprises an arm housing that at least partially encases the control arm wherein the proximal end of the spring arrangement is pivotally coupled to the arm housing.

25. The equipoise arm assembly of claim 23 wherein the disparate member comprises an arm housing that at least partially encases the control arm wherein the proximal end of the spring arrangement is pivotally coupled to the arm housing.

26. The equipoise arm assembly of claim 25 wherein a parallelogram pivoting arrangement is established between the second support arm, the distal arm joint, and the second distal arm joint whereby the second distal arm joint will demonstrate parallel movement relative to the distal arm joint and relative to the proximal arm joint.

27. An equipoise arm assembly for supporting an article in equipoise, the equipoise arm assembly comprising:

a support arm with a body portion with a proximal end and a distal end;

a proximal arm joint pivotally coupled to the proximal end of the support arm at a proximal pivot axis;

a means for supporting an article relative to the distal end of the support arm comprising a distal arm joint pivotally coupled to the distal end of the support arm at a distal pivot axis;

a spring arrangement with a distal end coupled to the body portion of the support arm and a proximal end pivotable about an effective pivot axis spaced a given distance from the proximal pivot axis to create a spring force moment arm of a given length whereby the spring arrangement will tend to provide a resistive torque in support of the support arm against rotation in a given direction wherein the spring arrangement includes a spring member with a proximal end and a distal end wherein the spring arrangement includes a plurality of spaced coupling points for the spring member whereby the spring member can have any one of a variety of initial spring extensions whereby the spring arrangement can be adapted to provide support to articles of differing weights; and a means for altering the distance between the effective pivot axis of the spring arrangement and the proximal pivot axis of the support arm during a pivoting of the support arm to change the length of the spring force moment arm thereby to change the resistive torque per unit spring force provided by the spring arrangement in support of the support arm;

wherein a parallelogram pivoting arrangement is established between the support arm and the proximal and distal arm joints whereby the distal arm joint will demonstrate parallel movement relative to the proximal arm joint wherein the parallelogram pivoting arrangement includes at least a first control arm and wherein the distal end of the spring arrangement is coupled to the first control arm.

28. The equipoise arm assembly of claim 27 wherein the spring arrangement includes a slidable coupler coupled to the proximal arm joint and wherein the plurality of spaced coupling points are disposed on the slidable coupler for adjustably retaining the proximal end of the spring member.

29. The equipoise arm assembly of claim 28 further comprising a means for slidably coupling the slidable coupler to the first control arm.

30. An equipoise arm assembly for supporting an article in equipoise, the equipoise arm assembly comprising:

a first support arm with a body portion with a proximal end and a distal end;

a first arm joint pivotally coupled to the proximal end of the first support arm at a proximal pivot axis;

a middle arm joint pivotally coupled to the distal end of the first support arm at a distal pivot axis;

a first arm spring arrangement with a distal end coupled to the body portion of the first support arm and a proximal end pivotable about an effective pivot axis spaced a given distance from the proximal pivot axis of the first arm joint to create a spring force moment arm of a given length whereby the first arm spring arrangement will tend to provide a resistive torque in support of the first support arm against rotation in a given direction wherein the first arm spring arrangement includes a spring member with a proximal end and a distal end;

a means for altering the distance between the effective pivot axis of the first arm spring arrangement and the proximal pivot axis of the first support arm during a pivoting of the first support arm to change the length of the spring force moment arm thereby to change the resistive torque per unit spring force provided by the first arm spring arrangement in support of the first support arm;

a second support arm with a body portion, a proximal end pivotally coupled to the middle arm joint to pivot about a proximal pivot axis, and a distal end pivotally coupled to a second arm joint;

a second arm spring arrangement with a distal end coupled to the body portion of the second support arm and a proximal end pivotable about an effective pivot axis spaced a given distance from the proximal pivot axis of the second support arm to create a spring force moment arm of a given length whereby the second arm spring arrangement will tend to provide a resistive torque in support of the second support arm against rotation in a given direction wherein the second arm spring arrangement includes a spring member with a proximal end and a distal end; and a means for altering the distance between the effective pivot axis of the second arm spring arrangement and the proximal pivot axis of the second support arm during a pivoting of the second support arm to change the length of the spring force moment arm thereby to change the resistive torque per unit spring force provided by the second arm spring arrangement in support of the second support arm wherein the means for altering the distance between the effective pivot axis of the first arm spring arrangement and the proximal pivot axis of the first support arm comprises a stop surface disposed adjacent to a portion of the first arm spring arrangement in combination with an open area adjacent to the stop surface wherein the first support arm can be pivoted through a given range of pivoting wherein the portion of the first spring arrangement will pivot through at least part of the open area until the portion of the first arm spring arrangement contacts the stop surface thereby to prevent further pivoting of at least part of the portion of the first arm spring arrangement whereby the effective pivot axis of the first arm spring arrangement and the spring force moment arm will be altered.

31. The equipoise arm assembly of claim 30 wherein the second support arm comprises a control arm that pivots about the proximal pivot axis of the second support arm and a disparate member that pivots relative to the middle arm joint with the control arm and wherein the means for altering the distance between the effective pivot axis of the second arm spring arrangement and the proximal pivot axis of the second support arm during a pivoting of the second support arm comprises a coupling of the proximal end of the second arm spring arrangement to the disparate member.

32. The equipoise arm assembly of claim 31 wherein the means for altering the distance between the effective pivot axis of the second arm spring arrangement and the proximal pivot axis of the second support arm operates to decrease the distance between the effective pivot axis and the proximal pivot axis during a pivoting of the second support arm to decrease the length of the spring force moment arm.

33. equipoise arm assembly of claim 30 wherein the first arm spring arrangement includes a pivot link coupled to the first arm joint wherein the stop surface and the open area are disposed adjacent to the pivot link whereby the pivot link can be pivoted through a given range of pivoting until at least a portion of the pivot link makes contact with at least a portion of the stop surface whereby that at least a portion of the pivot link will be prevented from further pivoting whereby the effective pivot axis of the first arm spring arrangement and the spring force moment arm will be altered.

34. The equipoise arm assembly of claim 33 wherein the pivot link comprises a flexible member.

35. The equipoise arm assembly of claim 34 wherein the stop surface is variably sloped whereby the pivot link will progressively make increasing contact with the stop surface as the first support arm is pivoted thereby creating a moving effective pivot axis for the first arm spring arrangement.

36. The equipoise arm assembly of claim 33 wherein the first arm spring arrangement includes multiple rigid pivot links and wherein the stop surface is variably sloped whereby the pivot links will make sequential contact with the stop surface as the first support arm is pivoted thereby creating a moving effective pivot axis for the first arm spring arrangement.

37. The equipoise arm assembly of claim 30 wherein the open area comprises a pivot alcove in the first arm joint.

38. An equipoise arm assembly for supporting an article in equipoise, the equipoise arm assembly comprising:

a first support arm with a body portion with a proximal end and a distal end;

a first arm joint pivotally coupled to the proximal end of the first support arm at a proximal pivot axis;

a middle arm joint pivotally coupled to the distal end of the first support arm at a distal pivot axis;

a first arm spring arrangement with a distal end coupled to the body portion of the first support arm and a proximal end pivotable about an effective pivot axis spaced a given distance from the proximal pivot axis of the first arm joint to create a spring force moment arm of a given length whereby the first arm spring arrangement will tend to provide a resistive torque in support of the first support arm against rotation in a given direction wherein the first arm spring arrangement includes a spring member with a proximal end and a distal end;

a means for altering the distance between the effective pivot axis of the first arm spring arrangement and the proximal pivot axis of the first support arm during a pivoting of the first support arm to change the length of the spring force moment arm thereby to change the resistive torque per unit spring force provided by the first arm spring arrangement in support of the first support arm;

a second support arm with a body portion, a proximal end pivotally coupled to the middle arm joint to pivot about a proximal pivot axis, and a distal end pivotally coupled to a second arm joint;

a second arm spring arrangement with a distal end coupled to the body portion of the second support arm and a proximal end pivotable about an effective pivot axis spaced a given distance from the proximal pivot axis of the second support arm to create a spring force moment arm of a given length whereby the second arm spring arrangement will tend to provide a resistive torque in support of the second support arm against rotation in a given direction wherein the second arm spring arrangement includes a spring member with a proximal end and a distal end; and a means for altering the distance between the effective pivot axis of the second arm spring arrangement and the proximal pivot axis of the second support arm during a pivoting of the second support arm to change the length of the spring force moment arm thereby to change the resistive torque per unit spring force provided by the second arm spring arrangement in support of the second support arm;

wherein the second support arm comprises a control arm that pivots about the proximal pivot axis of the second support arm and a disparate member that pivots relative to the middle arm joint with the control arm and wherein the means for altering the distance between the effective pivot axis of the second arm spring arrangement and the proximal pivot axis of the second support arm during a pivoting of the second support arm comprises a coupling of the proximal end of the second arm spring arrangement to the disparate member.

39. The equipoise arm assembly of claim 38 wherein the means for altering the distance between the effective pivot axis of the second arm spring arrangement and the proximal pivot axis of the second support arm operates to decrease the distance between the effective pivot axis and the proximal pivot axis during a pivoting of the second support arm to decrease the length of the spring force moment arm.

40. The equipoise arm assembly of claim 39 wherein the disparate member comprises an arm housing that at least partially encases the control arm wherein the proximal end of the second arm spring arrangement is pivotally coupled to the arm housing.

* * * * *